United States Patent
Foering et al.

(10) Patent No.: US 6,241,290 B1
(45) Date of Patent: Jun. 5, 2001

(54) PIPE COUPLING

(75) Inventors: Herbert Foering, Solingen; Thomas Gigowski, Grevenbroich; Michael Berane; Karl-Heinz Hartings, both of Langenfeld; Johannes Schurr, Bonn, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/297,234

(22) PCT Filed: Oct. 24, 1997

(86) PCT No.: PCT/DE97/02555

§ 371 Date: Apr. 26, 1999

§ 102(e) Date: Apr. 26, 1999

(87) PCT Pub. No.: WO98/19093

PCT Pub. Date: May 7, 1998

(30) Foreign Application Priority Data

Oct. 25, 1996 (DE) .................................. 196 45 151

(51) Int. Cl.$^7$ ................................................ F16L 13/16
(52) U.S. Cl. .................... 285/93; 285/382.7; 285/379; 285/347
(58) Field of Search .................. 285/93, 379, 347, 285/382, 382.2, 382.7

(56) References Cited

U.S. PATENT DOCUMENTS

| 3,632,141 | * | 1/1972 | Larsson | 285/382.7 |
| 4,371,199 | * | 2/1983 | Kushner et al. | 285/382.2 |
| 6,059,338 | * | 5/2000 | Diederichs | 385/382.2 |

FOREIGN PATENT DOCUMENTS

| 7312793 | * | 7/1978 | (CH) | 285/379 |
| 1525648 | * | 6/1969 | (DE) | 285/382.2 |
| 695901 | * | 8/1995 | (EP) | . |
| 2398955 | * | 2/1979 | (FR) | . |
| 13587 | * | 4/1972 | (JP) | 285/382.2 |

\* cited by examiner

*Primary Examiner*—Eric K. Nicholson
(74) *Attorney, Agent, or Firm*—Cohen, Pontani, Lieberman & Pavane

(57) ABSTRACT

A pipe coupling with a cylindrical pipe, whose smooth end section can be inserted into a fitting that has at least one sleeve-like area extending in the longitudinal direction. At least one sealing ring is arranged between the pipe outer wall and the fitting inner wall. The fitting and the pipe are connected securely to each other by an externally applied pressing tool that acts in a plastically deforming manner on at least one radial plane of the sleeve-like area of the fitting as well as the pipe section located under this. A metal sleeve, which can be placed over the pipe ends by force, is arranged between the pipe outer wall and the fitting inner wall. The fixed axial extension of the metal sleeve surrounds the pipe starting from the pipe end face, and the length of the metal sleeve is selected so as to correspond to the required overlap between the pipe and the fitting. This required overlap is attained when, after placement of the fitting onto the metal sleeve, or after insertion of the pipe and the metal sleeve into the fitting, the end face of the fitting facing the pipe coincides exactly with the end of the metal sleeve, and the sealing ring, seen in cross-section, is penetrated by the metal sleeve.

10 Claims, 1 Drawing Sheet

PIPE COUPLING

BACKGROUND OF THE INVENTION

1. Field of the Invention

The invention relates to a pipe coupling with a fitting and with a cylindrical pipe, whose smooth end section can be inserted into and pressed together with a fitting.

2. Discussion of the Prior Art

Pressed pipe couplings are offered by various manufacturers (Mannesmann, Seppelfricke, Viegener, etc.). The systems provided by these manufacturers have in common that a sealing ring is arranged between the inserted pipe end and the outer fitting. For this purpose, the fittings have one or two (Seppelfricke Co.) outward bulges, in which the sealing ring is arranged. During pressing, this bulge area and an adjacent cylindrical area are pressed simultaneously. In addition, there are systems offered by other manufacturers (Fraenkische Rohrwerke, Geberit, Roth, Unipipe, etc.) that operate with an inner fitting. Most of the aforementioned manufacturers use a composite pipe, specifically, a so-called three-layer pipe, in which an aluminum pipe with a welded longitudinal seam is arranged so as to form a diffusion block between a thick-walled inner pipe of PE and a thick-walled outer sleeve of PE-HD. In some of the cases in which composite pipes are used (e.g., Fraenkische Rohrwerke and Unipipe), pressing is carried out by means of a pressing sleeve placed externally onto the composite pipe. In contrast, the Roth Co. uses a plastic pipe, into which a support body can be inserted to provide support.

It is disadvantageous in the above solutions with an inner fitting that the conduit cross-section is reduced. Moreover, turbulence is created in the flow at the discontinuous transitions between the inner fitting and the pipe, increasing the flow resistance. It is disadvantageous in the solutions with an outer fitting that, once the pipe has been inserted into the fitting, it is not possible to determine from the outside whether the pipe has reached the prescribed insertion depth.

A generic pipe coupling is disclosed in German Reference DE 43 29 442 A1. This pipe coupling has an elongated metal sleeve that forms a fitting, into which are inserted the two pipes to be connected, which are of equal diameter. The metal sleeve, which has a diameter somewhat larger than that of the pipes, is beaded in the edge areas in such a way that the sleeve edges rest on the pipe walls without any gaps. The space between the sleeve and the pipe walls is filled by a rubber collar placed into the sleeve in a secure manner. After insertion of the pipes, crimps are pressed into the sleeve wall with such pressure as to form crimps of equal area in the pipe walls. In this system, it is disadvantageous that the wide pressing jaw requires a great deal of space, so that pressing cannot be carried out in close quarters. In addition, an extension is needed for most of the fittings, particularly in the case of T-pieces, so that the pressing clamps can be applied. Moreover, the aforementioned problem in systems with an outer fitting occurs in this system as well, i.e., the insertion depth cannot be checked for correctness.

In FR 2398955, FIG. 6, a pressed pipe coupling is disclosed, in which a metal sleeve, which penetrates an elongated sealing element in the form of a bushing, is arranged in the pressing area between the outer wall of a smooth-ended pipe and the inner wall of the widened end area of a pipe to be connected. The metal sleeve, at one end, has a collar, which preferably is connected to the end face of the smooth-ended pipe by welding. This known design has the disadvantage of being suitable only for large pipeline pipes. Moreover, expansion of the end area of the pipe to be connection is required. Further, the fixing in place of the metal sleeve on the end face of the smooth-ended pipe by welding acts contrary to the pressing method, which has been developed to make welding and soldering unnecessary.

SUMMARY OF THE INVENTION

The object of the invention is to [indicate] provide a pipe coupling with an outer fitting, wherein the required insertion depth, or the required overlap between pipe and fitting, can be recognized after insertion or placement. A further object is to design the outer fitting so that it is more economical to manufacture than previously known solutions.

Instead of a sealing collar, a metal sleeve is arranged between the pipe outer wall and the fitting inner wall, and the sealing ring, seen in cross-section, is penetrated in halved fashion by the metal sleeve. Preferably, a sealing ring is arranged in both end areas of the metal sleeve. As with the sealing collar, the length of the metal sleeve corresponds to the required overlap between the pipe and the fitting. In addition, the metal sleeve, to permit visual recognition of the required overlap, has two sections visually distinguishable from each other from the outside. The first section, which extends from the pipe end face, corresponds to the required overlap between the pipe and the fitting. This section is followed by a shorter control section. Preferably, the two sections are distinguishable by color. Alternatively, the accurate positioning of the metal sleeve can be ensured by providing the metal sleeve, at one end, with a stop that extends radially inward and covers the pipe end face. In addition, a stop that extends radially outward and covers the fitting end face can be provided at the end facing away from the pipe end face. To prevent the metal sleeve from moving after being put into place, there is at least one expansion element directed radially inward. To facilitate placement of the fitting, or insertion of the pipe end along with the metal sleeve into the fitting, it is proposed that the fitting have a slight conicity on the inner side—specifically, a conicity that decreases when seen from the end face side.

The fitting and/or pipe can be produced in C-steel, noble steel, titanium, aluminum, brass, plastic or composite materials.

The main advantages of the proposed pipe coupling can be summarized as follows:

Required overlap between pipe and fitting can be checked from outside.

No limits on conduit cross-section.

Small structural size of fitting.

Compensation of manufacturing tolerances when the Z-measure method is used for preassembly.

Less force required from pressing clamps.

Multi-level pressing is possible.

Fitting is simpler to manufacturer.

Lower production expense.

BRIEF DESCRIPTION OF THE DRAWINGS

The pipe coupling according to the invention is described in greater detail below in reference to three embodiments shown in the drawings. The drawings show.

DETAILED DESCRIPTION OF THE PREFERRED EMBODIMENTS

Figure 1:
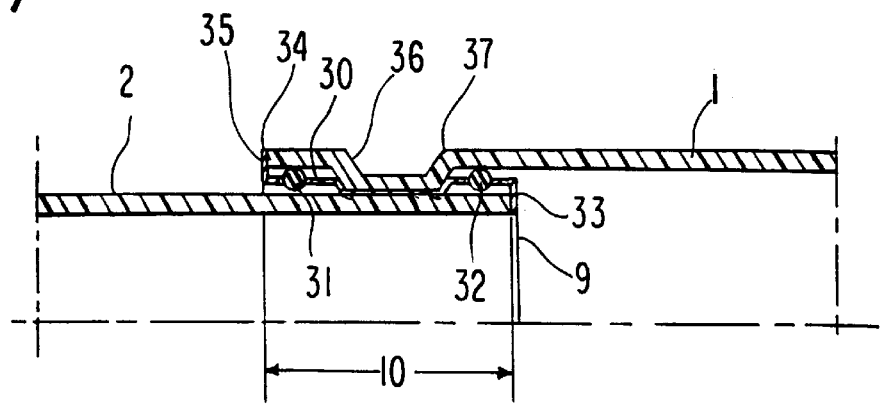
FIG. 1 longitudinal is a section of a first embodiment of the pipe coupling according to the invention.

FIG. 1 shows a longitudinal section through a first example of the pipe coupling according to the invention.

Instead of a sealing collar, a metal sleeve 30 is arranged between the pipe 2 and the fitting 1. In this example, the metal sleeve 30 is equipped at each end area with a sealing ring 31, 32. To make the seal effective, both sealing rings 31, 32 are penetrated, seen in cross-section, by the metal sleeve 30. Further, the metal sleeve 30 in this example has a stop 33 that covers the pipe face end 9 radially inwardly. This stop 33 ensures accurate positioning when the metal sleeve 30 is placed over the end area of the pipe 2. To ensure the required overlap, a stop 35 is also provided at the other end of the metal sleeve. This stop 35 extends radially outward and covers the fitting side 34. Movement by the metal sleeve 30 after its placement is prevented by at least one expansion element 36 that extends radially inward. In this example, there are two expansion elements 36, 37. If the metal sleeve 30 attempts to move, the expansion elements 36, 37 dig into in the outer circumferential surface of the pipe 2. The plastic deformation of the fitting 1 is shown in FIG. 1.

Figure 2:
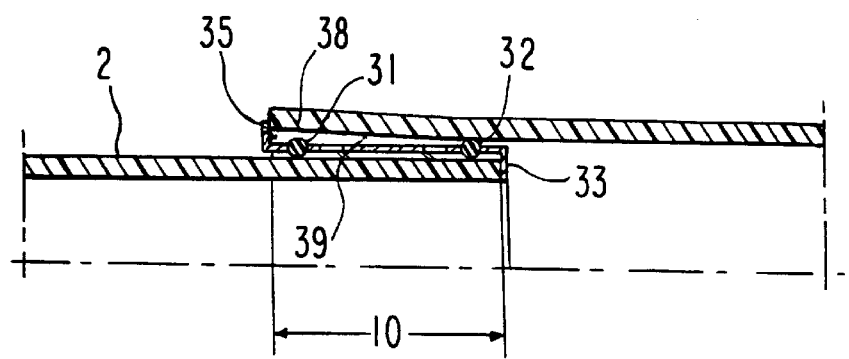
FIG. 2 variant is a of the embodiment in FIG. 1.

FIG. 2 shows a variant of the embodiment shown in FIG. 1. To facilitate the placement of the fitting 38 onto the metal sleeve 30, or the insertion of the end area of the pipe 2 along with the metal sleeve 30 into the fitting 38, the inner side 39 of the fitting 38 has a slight conicity.

Figure 3:
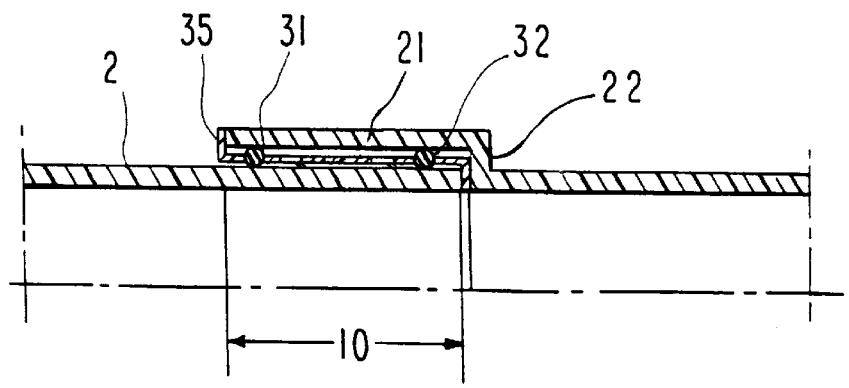
FIG. 3 a second shows embodiments.

FIG. 3 shows a second embodiment, in which the fitting 21 itself has a shoulder 22 extending radially inward. The shoulder 22 serves as a stop for the pipe 2 to be inserted with the metal sleeve 30 (FIG. 1). This embodiment also has the advantage that, when the radial extension of the stop 33 (FIG. 2) for the metal sleeve 30 (FIG. 1) and the shoulder 22 of the fitting 21 are suitably designed, a clear passage without discontinuities is formed.

What is claimed is:

1. A pipe coupling, comprising:
    a fitting that has at least one sleeve area extending in a longitudinal direction;
    a cylindrical pipe having smooth end section insertable into the fitting;
    at least one sealing ring arranged between an outer wall of the pipe and an inner wall of the fitting, the fitting and the pipe being securely connectable to each other by an externally applied force which acts in a plastically deforming manner on at least one radial plane of the sleeve area of the fitting as well as the pipe end section located beneath; and
    a metal sleeve arranged between the pipe outer wall and the fitting inner wall, the metal sleeve being placeable over the pipe end by force so that a fixed axial extension of the metal sleeve surrounds the pipe starting from an end face of the pipe, the metal sleeve having a length that corresponds to a required overlap between the pipe and the fitting, this required overlap being attained when an end face of the fitting facing the pipe coincides exactly with an end of the metal sleeve, the sealing ring being attached to the metal sleeve, the metal sleeve having an end facing away from the pipe end face, a radially outwardly extending stop being provided at the end of the metal sleeve so as to cover the fitting end face.

2. A pipe coupling as defined in claim 1, and further comprising a sealing ring arranged in each end area of the metal sleeve.

3. A pipe coupling as defined in claim 1, wherein the metal sleeve has at least one expansion element that extends radially inward.

4. A pipe coupling as defined in claim 1, wherein the metal sleeve has a stop at one end that extends radially inward so as to cover the pipe end face.

5. A pipe coupling as defined in claim 1, wherein the metal sleeve has two sections that are visually externally distinguishable, a first of the sections starting from the pipe end face and corresponding to the required overlap between the pipe and the fitting and being followed by the second section which is a short control section.

6. A pipe coupling as defined in claim 5, wherein the first section is a first color and the second section is a second color different from the first color.

7. A pipe coupling as defined in claim 1, wherein the fitting is configured to have an inner diameter with a decreasing conicity beginning from the end face.

8. A pipe coupling as defined in claim 1, wherein the fitting has a radially inwardly extending shoulder so as to form a clear passage having no discontinuities between the fitting and the pipe.

9. A pipe coupling, comprising:
    a fitting that has at least one sleeve area extending in a longitudinal direction;
    a cylindrical pipe having smooth end section insertable into the fitting;
    at least one sealing ring arranged between an outer wall of the pipe and an inner wall of the fitting, the fitting and the pipe being securely connectable to each other by an externally applied force which acts in a plastically deforming manner on at least one radial plane of the sleeve area of the fitting as well as the pipe end section located beneath; and
    a metal sleeve arranged between the pipe outer wall and the fitting inner wall, the metal sleeve being placeable over the pipe end by force so that a fixed axial extension of the metal sleeve surrounds the pipe starting from an end face of the pipe, the metal sleeve having a length that corresponds to a required overlap between the pipe and the fitting, this required overlap being attained when an end face of the fitting facing the pipe coincides exactly with an end of the metal sleeve, the sealing ring being attached to the metal sleeve, the metal sleeve having an end facing away from the pipe end face, a radially outwardly extending stop being provided at the end of the metal sleeve so as to cover the fitting end face, the metal sleeve having two sections that are visually externally distinguishable, a first of these sections starting from the pipe end face and corresponding to the required overlap between the pipe and the fitting and being followed by the second section which is a short control section.

10. A pipe coupling as defined in claim 9, wherein the first section is a first color and the second section is a second color different from the first color.

* * * * *